US009854622B2

United States Patent
Rosa et al.

(10) Patent No.: US 9,854,622 B2
(45) Date of Patent: Dec. 26, 2017

(54) CONFIGURATION OF CARRIER-RELATED REFERENCE SIGNAL TRANSMISSION

(75) Inventors: Claudio Rosa, Randers (DK); Frank Frederiksen, Klarup (DK); Peter Skov, Beijing (CN); Timo Erkki Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 145 days.

(21) Appl. No.: 14/384,809

(22) PCT Filed: Mar. 15, 2012

(86) PCT No.: PCT/EP2012/054588
§ 371 (c)(1),
(2), (4) Date: Sep. 12, 2014

(87) PCT Pub. No.: WO2013/135295
PCT Pub. Date: Sep. 19, 2013

(65) Prior Publication Data
US 2015/0009898 A1    Jan. 8, 2015

(51) Int. Cl.
*H04W 76/04* (2009.01)
*H04L 5/00* (2006.01)
(Continued)

(52) U.S. Cl.
CPC ........... *H04W 76/048* (2013.01); *H04L 5/001* (2013.01); *H04L 5/0048* (2013.01);
(Continued)

(58) Field of Classification Search
None
See application file for complete search history.

(56) References Cited

U.S. PATENT DOCUMENTS

| 2011/0158188 A1* | 6/2011 | Womack | H04W 56/0005 370/329 |
| 2011/0249578 A1* | 10/2011 | Nayeb Nazar | H04L 1/0027 370/252 |
| 2013/0223311 A1* | 8/2013 | Wang | H04L 5/0091 370/311 |

FOREIGN PATENT DOCUMENTS

| KR | 2010/0052064 A | 5/2010 |
| WO | WO 2011/136266 A1 | 11/2011 |

OTHER PUBLICATIONS

Huawei; "Opportunities for Energy Savings in LTE Networks"; R1-100275; 3GPP TSG RAN WG1 Meeting #59bis; Valencia, Spain, Jan. 18-22, 2010; whole document (4 pages).
(Continued)

*Primary Examiner* — Anh-Vu Ly
*Assistant Examiner* — Hector Reyes Ortiz
(74) *Attorney, Agent, or Firm* — Harrington & Smith

(57) ABSTRACT

There are provided measures for configuration of carrier-related reference signal transmission. Such measures exemplarily include setting of a transmission mode for reference signal transmission on a carrier out of at least a long-cycle discontinuous transmission mode and a short-cycle discontinuous transmission mode, said long-cycle discontinuous transmission mode having a longer transmission discontinuity period than the short-cycle discontinuous transmission mode, and configuration of a transmission of at least one reference signal on the carrier according to the set transmission mode. The transmission mode setting may for example be based on at least one of an activation state of the carrier as serving cell and/or secondary cell and/or measurement object cell and a period of radio resource management measurement on the carrier.

17 Claims, 9 Drawing Sheets

(51) Int. Cl.
*H04L 27/26* (2006.01)
*H04W 88/10* (2009.01)
(52) U.S. Cl.
CPC ........ *H04L 5/0098* (2013.01); *H04L 27/2613* (2013.01); *H04W 88/10* (2013.01)

(56) References Cited

OTHER PUBLICATIONS

3GPP TSG-RAN WG1 Meeting #67, San Francisco, USA, Nov. 14-18, 2011, R1-113754, "Discussion on some issues of additional carrier types", ZTE, 4 pgs.
3GPP TSG-RAN WG1#67, Nov. 14-18, 2011, San Francisco, USA, R1-114020, "Characteristics of Additional Carrier Types", Motorola Mobility, 6 pgs.
3GPP TSG RAN WG1 Meeting #67, San Francisco, USA Nov. 14-18, 2011, R1-114044, "Design Considerations for Additional Carrier Types", Alcatel-Lucent, Alcatel-Lucent Shanghai Bell, 4 pgs.

\* cited by examiner

| Carrier state machine for configuration of RS transmission | | RRM Measurement from Neighbor UEs | |
| --- | --- | --- | --- |
| | | ON period | OFF period |
| SCell state | Activated | Complete/short DTX cycle RS TX | Complete/short DTX cycle RS TX |
| | Deactivated | Reduced/long DTX cycle RS TX | No RS TX |

Figure 3

CONFIGURATION OF CARRIER-RELATED REFERENCE SIGNAL TRANSMISSION

FIELD

The present invention relates to configuration of carrier-related reference signal transmission. More specifically, the present invention exemplarily relates to measures (including methods, apparatuses and computer program products) for realizing configuration of carrier-related reference signal transmission.

BACKGROUND

The present specification generally relates to carrier implementation in communication systems and/or network deployments, such as UMTS, HSPA, LTE/LTE-A or the like. More specifically, the present specification generally relates to carrier implementation in the context of carrier aggregation (CA) techniques in such communication systems and/or network deployments, especially carrier implementation enabling energy saving at a network side (e.g. an eNodeB representing a base station or access node).

In such communication systems and/or network deployments, various reference signals are transmitted from the network side (e.g. an eNodeB representing a base station or access node) to a terminal side (e.g. an UE), not only but also in the context of carrier aggregation (CA) techniques. In 3GPP systems for example, reference signals such as CRS, CSI-RS, PSS, SSS and/or PBCH are transmitted on a carrier (potentially subject to CA) by the eNodeB and used by the UEs for one or more of time synchronization, frequency synchronization, tracking, CQI measurements, channel estimation, channel demodulation, and RRM measurements. Such reference signals, including e.g. the CRS, are typically transmitted in every TTI (e.g. in every subframe) on the carrier so as to enable proper execution of the aforementioned procedures at the UEs.

This means that, before switching off transmission of a carrier carrying such reference signals (including e.g. the CRS) for enabling energy savings at the eNodeB, the eNodeB has to make sure that there are no UEs in its coverage area, which are configured to perform any one of the aforementioned procedures on the corresponding carrier.

In practice, such requirement for carrier switch-off leads to the restrictions that the corresponding cell (i.e. the PCell on the corresponding carrier) should not be in the neighbor list of any UE, and that all SCells on the corresponding carrier should be de-configured or, alternatively, all SCells on the corresponding carrier should be deactivated and configured with a deactivated SCell measurement cycle (e.g. a measurement cycle set to infinity). These restrictions in practice mean that, even when configuring a carrier as SCell-only carrier, switching off transmission thereof is a quite heavy procedure subject to severe requirements. As a consequence, only adaptation to slow traffic variations is possible by way of such conventional carrier switch-off procedure.

In an effort to reduce signaling of reference signals in time and frequency domain (as compared to conventional and/or backward compatible carriers) for enabling energy savings at the eNodeB, it may be conceivable to reduce CRS bandwidth (i.e. a narrower CRS bandwidth than system bandwidth), to reduce frequency of CRS transmission (i.e. avoid a CRS transmission in every subframe), or to use CSI-RS instead of CRS. However, in such conceivable approaches, a reference signal for time and frequency synchronization, tracking, and RRM measurements needs to be provided. This means that the eNodeB has to continuously provide some reference signal with a given frequency and time resolution as long as there are UEs which are configured to perform any one of the aforementioned procedures on the corresponding carrier. As a consequence, practically available energy savings at the eNodeB, especially in the context of CA techniques, are quite limited.

Accordingly, any conventional and/or backward compatible carrier implementation only provides for adaptability to slow traffic variations and a limited energy savings potential.

Therefore, there is a need to provide for a configuration of carrier-related reference signal transmission, which is capable of realizing adaptability to fast traffic variations and an enhanced energy savings potential.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising setting a transmission mode for reference signal transmission on a carrier out of at least a long-cycle discontinuous transmission mode and a short-cycle discontinuous transmission mode, said long-cycle discontinuous transmission mode having a longer transmission discontinuity period than the short-cycle discontinuous transmission mode, and configuring transmission of at least one reference signal on the carrier according to the set transmission mode According to an exemplary aspect of the present invention, there is provided a method comprising determining a transmission mode for reference signal transmission on a carrier from a base station or access node of a communication system out of at least a long-cycle discontinuous transmission mode and a short-cycle discontinuous transmission mode, said long-cycle discontinuous transmission mode having a longer transmission discontinuity period than the short-cycle discontinuous transmission mode, and setting the determined transmission mode as a reception mode for reference signal reception on the carrier.

According to an exemplary aspect of the present invention, there is provided an apparatus comprising an interface configured to communicate with at least another apparatus, a memory configured to store computer program code, and a processor configured to cause the apparatus to perform: setting a transmission mode for reference signal transmission on a carrier out of at least a long-cycle discontinuous transmission mode and a short-cycle discontinuous transmission mode, said long-cycle discontinuous transmission mode having a longer transmission discontinuity period than the short-cycle discontinuous transmission mode, and configuring transmission of at least one reference signal on the carrier according to the set transmission mode.

According to an exemplary aspect of the present invention, there is provided an apparatus comprising an interface configured to communicate with at least another apparatus, a memory configured to store computer program code, and a processor configured to cause the apparatus to perform: determining a transmission mode for reference signal transmission on a carrier from a base station or access node of a communication system out of at least a long-cycle discontinuous transmission mode and a short-cycle discontinuous transmission mode, said long-cycle discontinuous transmission mode having a longer transmission discontinuity period than the short-cycle discontinuous transmission mode, and setting the determined transmission mode as a reception mode for reference signal reception on the carrier.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

The computer program product may comprise or may be embodied as a (tangible) computer-readable (storage) medium or the like on which the computer-executable computer program code is stored, and/or the program is directly loadable into an internal memory of the computer or a processor thereof.

Advantageous further developments or modifications of the aforementioned exemplary aspects of the present invention are set out in the following.

Any one of the above aspects enables configuration of carrier-related reference signal transmission, which is capable of realizing adaptability to fast traffic variations and an enhanced energy savings potential.

Thus, improvement is achieved by methods, apparatuses and computer program products enabling/realizing an advanced configuration of carrier-related reference signal transmission.

BRIEF DESCRIPTION OF THE DRAWINGS

In the following, the present invention will be described in greater detail by way of non-limiting examples with reference to the accompanying drawings, in which FIG. 3 shows a schematic diagram of a carrier-related state machine for a configuration of reference signal transmission according to exemplary embodiments of the present invention.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, the present invention and its embodiments may be applicable in any communication system and/or network deployment in which reference signal transmission is effected via a carrier.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) configuration of carrier-related reference signal transmission.

Hereinafter, when reference is generally made to reference signals (RS), such reference signals may specifically comprise for example one or more of a common reference signal (CRS), a channel state information reference signal (CSI-RS), a primary synchronization signal (PSS), a secondary synchronization signal (SSS), and a physical broadcast channel (PBCH).

Figure 1:
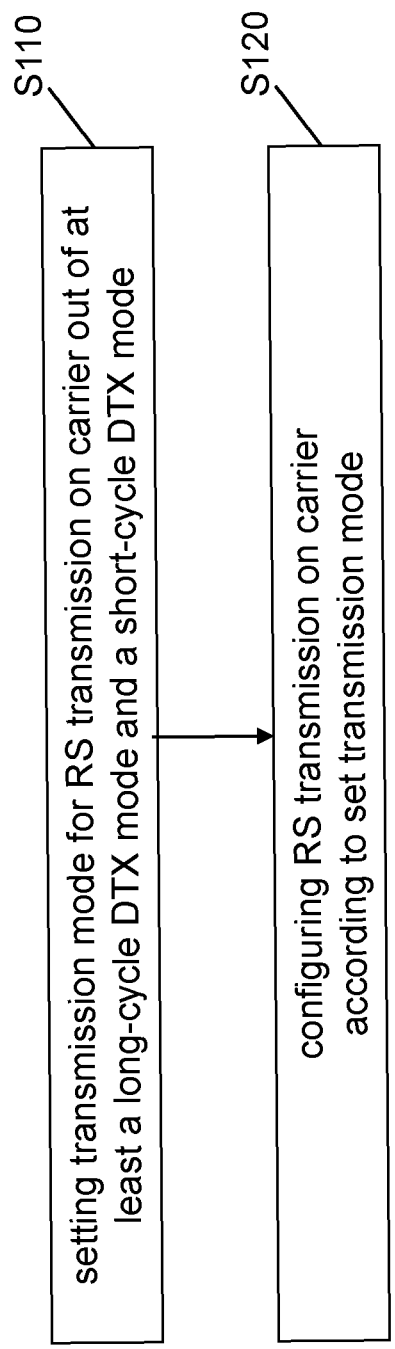
FIG. 1 shows a schematic diagram of a first example of a procedure at a network side according to exemplary embodiments of the present invention.

FIG. 1 shows a schematic diagram of a first example of a procedure at a network side according to exemplary embodiments of the present invention.

The exemplary procedure according to FIG. 1 may be performed at or by a network element (or modem thereof), such as a base station or access node of a communication system (e.g. an eNodeB).

As shown in FIG. 1, a procedure according to exemplary embodiments of the present invention comprises an operation (S110) of setting a transmission mode for reference signal (RS) transmission on a carrier out of at least a long-cycle discontinuous transmission (DTX) mode and a short-cycle discontinuous transmission (DTX) mode, said long-cycle discontinuous transmission (DTX) mode having a longer transmission discontinuity period than the short-cycle discontinuous transmission (DTX) mode, and an operation (S120) of configuring transmission of at least one reference signal on the carrier according to the set transmission mode.

Accordingly, there are provided at least two different DTX cycles for RS transmission on a carrier. This basically corresponds to at least two different DTX transmission modes (or configurations) for RS transmission on a carrier, one with a "long" DTX cycle and one with a "short" DTX cycle for the transmission of one or more reference signals.

According to exemplary embodiments of the present invention, the transmission of the at least one reference signal may be configured on a subframe basis on the carrier. In this case, the RS/RSs (including e.g. CRS and/or other reference signals) are transmitted in respective subframes (or subframe periods), and a configured transmission of at least one reference signal on the carrier basically corresponds to a correspondingly configured transmission of subframes carrying the at least one reference signal on the carrier. Further, the transmission discontinuity period of any one of the long-cycle and short-cycle discontinuous transmission modes is an integer multiple of the subframe period on the carrier, and is preferably longer than a TTI (or subframe of period thereof).

According to exemplary embodiments of the present invention, the transmission mode may be set on the basis of at least one of an activation state of the carrier as serving cell and/or secondary cell and/or measurement object cell and a period of radio resource management (RRM) measurement on the carrier.

The carrier activation state adopts an activated state, when there is at least one terminal in the coverage area of the network element transmitting the at least one reference signal (e.g. the eNodeB) which has at least one of an activated serving cell (or PCell) and/or secondary cell (or SCell) and/or a configured measurement object on the carrier, e.g. at least one terminal witch one or more activated SCells on the corresponding carrier. Otherwise, when there is no such terminal in the coverage area of the network element transmitting the at least one reference signal (e.g. the eNodeB), the activation state adopts a deactivated state. The carrier activation state may be monitored or may be determined based on monitoring thereof by the network element transmitting the at least one reference signal (e.g. the eNodeB), as outlined below.

The RRM measurement period adopts an ON period or an OFF period. The RRM measurement period may adopt the OFF period, when there is at least one terminal in the coverage area of the network element transmitting the at least one reference signal (e.g. the eNodeB) or its neighboring cell coverage area which has/wants to perform RRM measurements. Otherwise, when there is no such terminal in the coverage area of the network element transmitting the at least one reference signal (e.g. the eNodeB) or its neighboring cell coverage area, the RRM measurement period may adopt the OFF period. The RRM measurement period for the corresponding carrier may be established (i.e. configured) or may be determined based on establishment thereof by the network element transmitting the at least one reference signal (e.g. the eNodeB), as outlined below.

Figure 2:
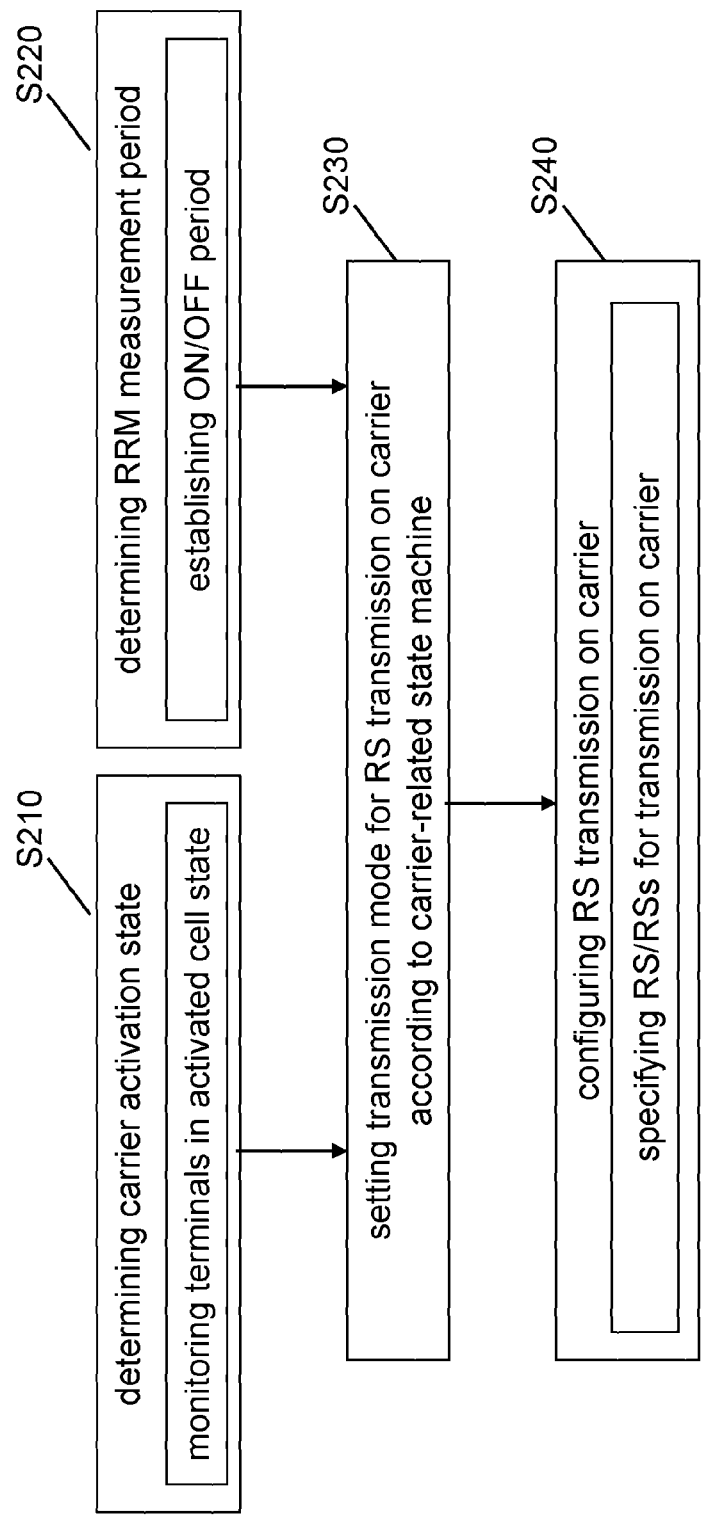
FIG. 2 shows a schematic diagram of a second example of a procedure at a network side according to exemplary embodiments of the present invention.

FIG. 2 shows a schematic diagram of a second example of a procedure at a network side according to exemplary embodiments of the present invention.

Similar to FIG. 1, the exemplary procedure according to FIG. 2 may be performed at or by a network element (or modem thereof), such as a base station or access node of a communication system (e.g. an eNodeB).

The exemplary procedure according to FIG. 2 may be regarded as a modification/variation or specific implementation of the exemplary procedure according to FIG. 1. In this regard, operations S230 and S240 according to FIG. 2 basically correspond to operations S110 and S120 according to FIG. 1, respectively. Accordingly, reference is made to the above description in conjunction with FIG. 1 for details, while in the following specifics of the exemplary procedure according to FIG. 2 are outlined.

Basically, the exemplary procedure according to FIG. 2 relates to exemplary embodiments of the present invention, in which the transmission mode is set on the basis of at least one of an activation state of the carrier as serving cell and/or secondary cell and/or measurement object cell and a period of radio resource management (RRM) measurement on the carrier, as outlined above.

As shown in FIG. 2, a procedure according to exemplary embodiments of the present invention may comprise an operation (S210) of determining an (activated/deactivated) activation state of the carrier as serving cell and/or secondary cell and/or measurement object cell, and/or an operation (S220) of determining a (on/off) period of radio resource management measurement on the carrier. In this regard, as outlined above, the operation (S210) of activation state determination may comprise monitoring presence of terminals having at least one of an activated serving cell and/or secondary cell and/or a configured measurement object on the carrier, wherein the activation state of the carrier is determined as an activated state, when presence of at least one such terminal is monitored, and the activation state of the carrier is determined as a deactivated state, when presence of no such terminal is monitored, and/or the operation (S220) of resource management measurement period determination may comprise establishing an on period or an off period for the carrier.

It is noted that any one of the determination operations mentioned above may be omitted or skipped, for example when the respective parameter is already known (as a result of some other procedure, such as notification from some other entity, or (pre-)stored information) or the respective parameter is not to be used in the subsequent procedure, such as in the setting operation S230 described below.

As shown in FIG. 2, in a procedure according to exemplary embodiments of the present invention, the operation (S230) of setting the transmission mode for reference signal (RS) transmission may be accomplished on the basis of the (determined) carrier activation state and/or the (determined) RRM measurement period, e.g. according to a carrier-related state machine mechanism for configuration of RS transmission, as exemplarily depicted in FIG. 3.

According to exemplary embodiments of the present invention, the short-cycle DTX mode may be set as the transmission mode for RS transmission on the carrier, when the activation state of the carrier is (determined as) an activated state. Further, the long-cycle DTX mode may be set as the transmission mode for RS transmission on the carrier, when the activation state of the carrier is (determined as) a deactivated state. Still further, the long-cycle DTX mode may be set as the transmission mode for RS transmission on the carrier, when the activation state of the carrier is (determined as) a deactivated state and the RRM measurement period on the carrier is (determined as) an on period, and a transmission mode without any RS transmission on the carrier may be set, when the activation state of the carrier is (determined as) a deactivated state and the RRM measurement period on the carrier is (determined as) an off period.

As shown in FIG. 2, in a procedure according to exemplary embodiments of the present invention, the operation (S240) of configuring the transmission of the at least one reference signal on the carrier may comprise specifying the at least one reference signal configured for transmission on the carrier. Such RS configuration may for example be accomplished according to the set transmission mode and/or according to the determined (on/off) period of the RRM measurement on the carrier.

According to exemplary embodiments of the present invention, the at least one RS may (be specified to) comprise one or more reference signals suitable for enabling RRM measurement on the carrier at a UE, especially when the RRM measurement period on the carrier is (determined as) an on period. Further, the at least one RS may (be specified to) comprise one or more RSs suitable for enabling one or more of time synchronization, frequency synchronization, tracking, channel quality (e.g. CQI) measurement, channel estimation, channel demodulation, and RRM measurement on the carrier at a UE, especially when the activation state of the carrier is (determined as) an activated state.

For example, a configuration of carrier-related reference signal transmission according to exemplary embodiments of the present invention may be implemented as follows.

The transmission mode with long DTX cycle is operable for UEs for which the corresponding carrier is either a deactivated SCell or simply a cell with a configured measurement object. In this case, reference symbols (which e.g. can be a combination of PSS/SSS/PBCH as well as CRS and/or CSI-RS) are usable to perform RRM measurements. Therefore, the frequency at which they are provided can be relatively low, i.e. they need to be transmitted only seldom (as compared with the below case).

The transmission mode with short DTX cycle is operable for UEs having an activated SCell on the corresponding carrier. Since in this case reference signals are needed to maintain synchronization, etc. and possibly also to perform CQI measurements and the like, the frequency at which they are provided is to be relatively high, i.e. they need to be transmitted more often (as compared with the above case).

Accordingly, when there are no UEs with an activated SCell on the corresponding carrier, the eNodeB or the like can switch to the transmission mode with long DTX cycle for RS transmission, thus allowing for higher energy savings compared to the case where a short DTX cycle needs to be maintained, as long as there are deactivated SCell(s) configured or at least UEs with a configured measurement object on the corresponding carrier.

FIG. 3 shows a schematic diagram of a carrier-related state machine for a configuration of reference signal transmission according to exemplary embodiments of the present invention.

As indicated above, the carrier-related state machine according to FIG. 3 may be used for a configuration of reference signal transmission according to exemplary embodiments of the present invention, such as the setting operation (S230) according to FIG. 2.

In FIG. 3, the terms "complete RS TX" and "short DTX cycle RS TX" as well as the terms "reduced RS TX" and "long DTX cycle RS TX" may be regarded as equivalents, both referring to the RS transmission configuration in the time domain, respectively. Alternatively, these terms may be regarded as referring to the contents of the RS TX (e.g. the reference signal/s configured for transmission) and the time domain configuration of the RS transmission, respectively. In this regard, reference is made to the above descriptions in conjunction with operations S230 and S240 according to FIG. 2, respectively.

Figure 4:
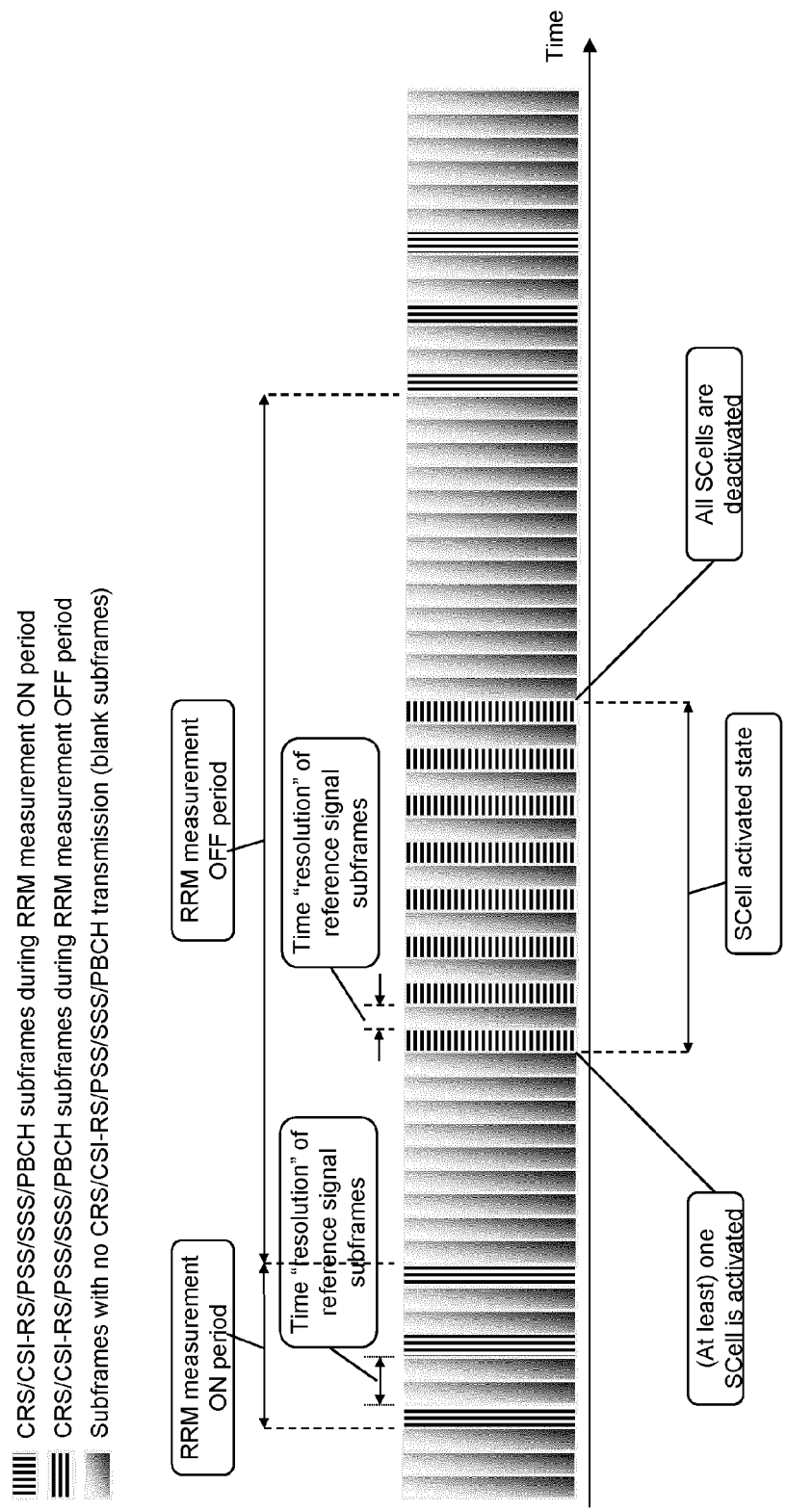
FIG. 4 shows a time chart of an example of a configuration of a subframe-based reference signal transmission according to exemplary embodiments of the present invention.

FIG. 4 shows a time chart of an example of a configuration of a subframe-based reference signal transmission according to exemplary embodiments of the present invention.

The exemplary time-domain configuration of a subframe-based reference signal transmission according to FIG. 4 is based on the carrier-related state machine according to FIG. 3 by way of example only. Further, the exemplary time-domain configuration of a subframe-based reference signal transmission according to FIG. 4 assumes that the same reference signal or signals is/are configured for transmission in both RRM measurement on and off periods, namely any conceivable combination of CRS, CSI-RS, PSS, SSS and PBCH.

As evident from FIG. 4, a configuration of carrier-related reference signal transmission according to exemplary embodiments of the present invention may be implemented as follows.

In the example of FIG. 4, during the RRM measurement ON period, the eNB transmits CRS and/or other RSs (e.g. CSI-RS, PSS/SSS) with a given configuration in (frequency and) time domain, e.g. a reduced/long DTX cycle RS transmission (i.e. with long/low time resolution). While no distinction between SCell "actived" state and SCell "deactivated" state is made here, it may be applied according to the carrier-related state machine according to FIG. 3.

In the example of FIG. 4, during the RRM measurement OFF period, distinction between SCell "actived" state and SCell "deactivated" state is made. If the carrier is in SCell "deactivated" state, the eNodeB only transmits "blank" subframes, i.e. CRS and/or other RS (e.g. CSI-RS, PSS/SSS) are not transmitted. In this situation, the eNodeB can completely switch-off transmission on the corresponding carrier without impacting the RRM measurements of other terminals, or the like. If the carrier is in SCell "activated" state, the eNodeB transmits CRS and/or other RS (e.g. CSI-RS, PSS/SSS) with a given configuration in (frequency and) time domain, e.g. a complete/short DTX cycle RS transmission (i.e. with short/high time resolution).

As evident from the above, a RS (e.g. CRS/CSI-RS/PSS/SSS/PBCH configuration) in (frequency and) time domain to be used during RRM measurement ON and OFF periods may be the same. Such same configuration can simplify eNodeB as well UE implementation, since no multiple CRS/CSI-RS/PSS/SSS/PBCH configurations are to be configured.

Figure 5:
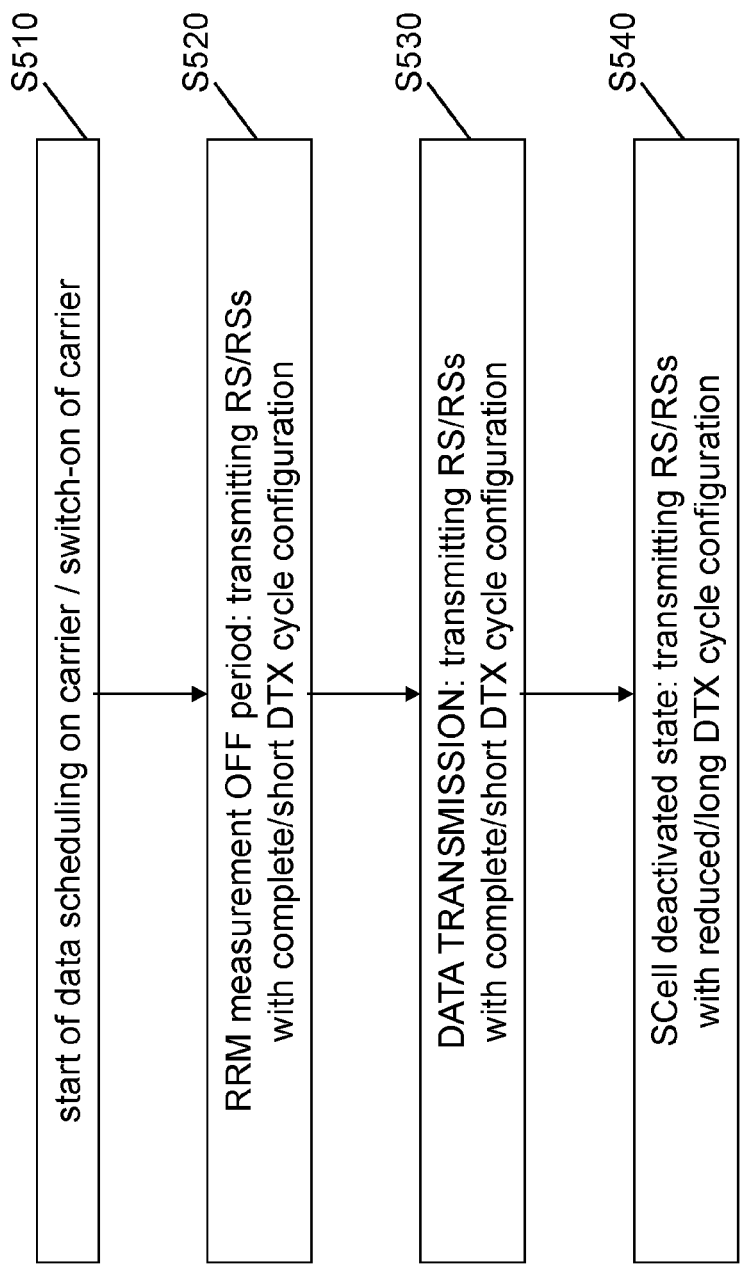
FIG. 5 shows a schematic diagram of a third example of a procedure according to exemplary embodiments of the present invention.

FIG. 5 shows a schematic diagram of a third example of a procedure according to exemplary embodiments of the present invention.

The procedure according to FIG. 5 represents an example of a possible implementation according to exemplary embodiments of the present invention.

Generally, it is noted that a RRM measurement OFF period can be set to a quite high value, e.g. several hundreds of milliseconds or even a few seconds. On the other hand, a RRM measurement ON period needs to be long enough to allow the UEs to first time and frequency synchronize to the corresponding carrier, and then perform the necessary measurements. This depends on the periodicity at which RSs (such as CRS/CSI-RS/PSS/SSS/PBCH) are provided during the RRM measurement ON period. However, assuming that CRS/CSI-RS/PSS/SSS/PBCH subframes are provided approximated every 5 ms, a RRM measurement ON period of a few tens of millisecond should be enough.

In operation S510 according to FIG. 5, a data scheduling may be started on a carrier in question and/or the carrier in question may be switched on. When data arrives in the eNodeB buffer and the eNodeB decides to start scheduling data on a carrier (i.e. carrier type) according to exemplary embodiments of the present invention, the eNodeB first sends an activation message to the corresponding UE using its PCell. At the same time, the eNodeB switches on the carrier and start transmitting RSs (such as CRS/CSI-RS/PSS/SSS/PBCH) with the specified configuration during RRM measurement OFF period, as illustrated in operation S520 according to FIG. 5. During data transmission, as illustrated in operation S530 according to FIG. 5, CRS and/or CSI-RS can also be used for CQI estimation, time and frequency tracking, RRM measurements, etc. The RSs (such as CRS/CSI-RS/PSS/SSS/PBCH) are transmitted with the specified configuration during SCell activated state. Upon receiving the activation message from the eNodeB, the UE performs time and frequency synchronization, and can start receiving data e.g. via PDSCH on the corresponding carrier scheduled e.g. using cross-CC scheduling from the PCell.

As long as there are terminals with at least an activated SCell on the corresponding carrier, the eNodeB provides RSs (such as CRS/CSI-RS/PSS/SSS/PBCH subframes) at the configured time interval (see operation S530 according to FIG. 5), as the activated UEs are expecting that. The assumption for terminals with only deactivated SCell(s) in correspondence with the considered carrier is that the eNodeB will only transmit RSs (such as CRS/CSI-RS/PSS/SSS/PBCH subframes) during the RRM measurement ON period (see operation S540 according to FIG. 5).

As evident from the above, procedures according to exemplary embodiments of the present invention, such as those illustrated in FIGS. 1 and 2, may be operable when the corresponding carrier is switched on and/or data scheduling on the corresponding carrier is started.

While in the foregoing description focus is made to the operations and functionalities at the network side, e.g. the eNodeB, it is to be understood that corresponding operations and functionalities at the terminal side, e.g. the UE, are equally encompassed by corresponding embodiments of the present invention, respectively. Such operations and functionalities at the terminal side, e.g. the UE, are deemed to be self-evident for a person skilled in the art in view of the above description of the operations and functionalities at the network side, e.g. the eNodeB.

For example, a terminal may be configured to receive a transmission of at least one reference signal on the carrier in a configuration according to a set transmission mode (as outlined above) from a corresponding base station or access node, and to perform corresponding operations such as time synchronization, frequency synchronization, tracking, CQI measurements, channel estimation, channel demodulation, and RRM measurements. The operation or measurement performed by the terminal may for example depend on its SCell state and/or the current RRM measurement period.

For example, a terminal may be configured to sound or monitor whether the eNodeB is sending RSs (such as CRS/CSI-RS/PSS/SSS/PBCH subframes) also during the RRM measurement OFF period, and to potentially perform RRM measurements in such period as well.

Figure 6:
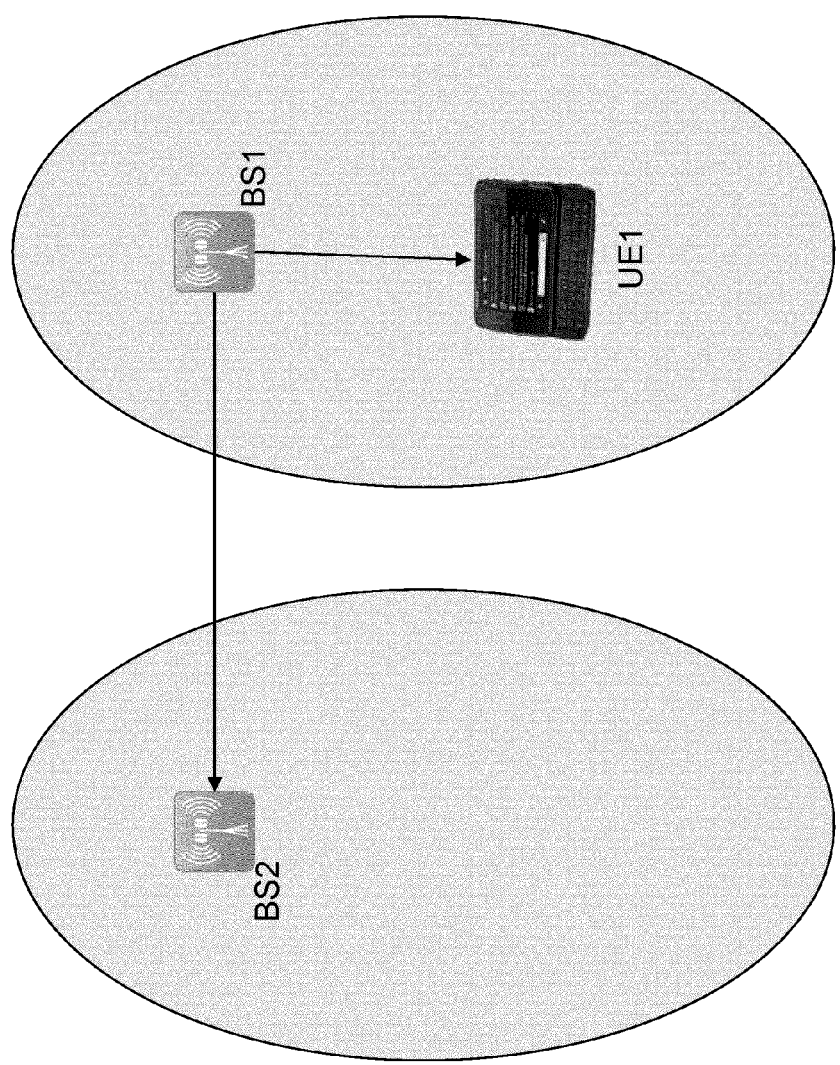
FIG. 6 shows a schematic diagram of exemplary information exchange procedures according to exemplary embodiments of the present invention.

FIG. 6 shows a schematic diagram of exemplary information exchange procedures according to exemplary embodiments of the present invention.

As shown in FIG. 6, information regarding the RS TX configuration and/or the transmission mode setting for/on a carrier may be exchanged between various entities operable in a communication system.

For example, when assuming that base station or access node BS1 represents a network element at which a procedure according to FIGS. 1 and/or 2 is performed, corresponding information (e.g. information on a transmission configuration of the at least one reference signal on the carrier) may be signaled to a (i.e. another) base station or access node, such as BS2, and/or a terminal UE1. From the point of view of the (i.e. other) base station or access node, such as BS2, and/or the terminal UE1, corresponding information (e.g. information on a transmission configuration of the at least one reference signal on the carrier) may be acquired (by way of receipt) from the base station or access node BS1. An information exchange between base station or access nodes, i.e. between eNodeBs, may be accomplished e.g. via an X2 Interface. An information exchange between a base station or access node and a terminal may be accomplished e.g. by RRC signaling.

In this regard, a (RS) transmission mode of/from a base station or access node corresponds to, i.e. is set as, a (RS) reception mode of/for the terminal.

By way of such information exchange, configuration of reception and/or measurement set/sets (on/for the carrier in question) at the receiving (i.e. terminal) side may be facilitated. At the receiving (i.e. terminal) side, the thus acquired information may be utilized in terms of reception mode determination and/or setting, carrier operation, and the like. In this regard, a reception mode refers to an actual RS reception operation and/or a RS (RRM-based) measurement operation.

Figure 7:
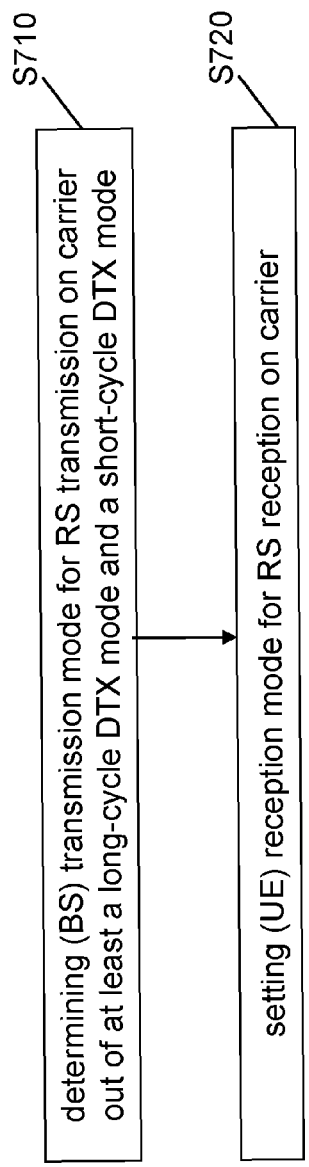
FIG. 7 shows a schematic diagram of a first example of a procedure at a terminal side according to exemplary embodiments of the present invention.

FIG. 7 shows a schematic diagram of a first example of a procedure at a terminal side according to exemplary embodiments of the present invention.

The exemplary procedure according to FIG. 7 may be performed at or by a terminal (or modem thereof), such as a user equipment operable in a communication system (e.g. a UE).

As shown in FIG. 7, a procedure according to exemplary embodiments of the present invention comprises an operation (S710) of determining a transmission mode for reference signal transmission on a carrier from a base station or access node of a communication system (i.e. a network-side transmission mode) out of at least a long-cycle discontinuous transmission mode and a short-cycle discontinuous transmission mode, said long-cycle discontinuous transmission mode having a longer transmission discontinuity period than the short-cycle discontinuous transmission mode, and an operation (S720) of setting the determined (network-side) transmission mode as a reception mode (i.e. a terminal-side reception mode) for reference signal reception on the carrier.

Accordingly, at least two different DTX cycles for RS reception and/or measurement on a carrier may be set, e.g. at a terminal side. This basically corresponds to at least two different DTX reception modes (or configurations) for RS reception on a carrier, one with a "long" DTX cycle and one with a "short" DTX cycle for the reception (and/or measurement) of one or more reference signals.

According to exemplary embodiments of the present invention, the UE may determine the network mode of operation and adjust its mode of operation, i.e. its reception/measuring pattern, accordingly (e.g. by changing the measurement pattern or having less strict measurement requirements).

Figure 8:
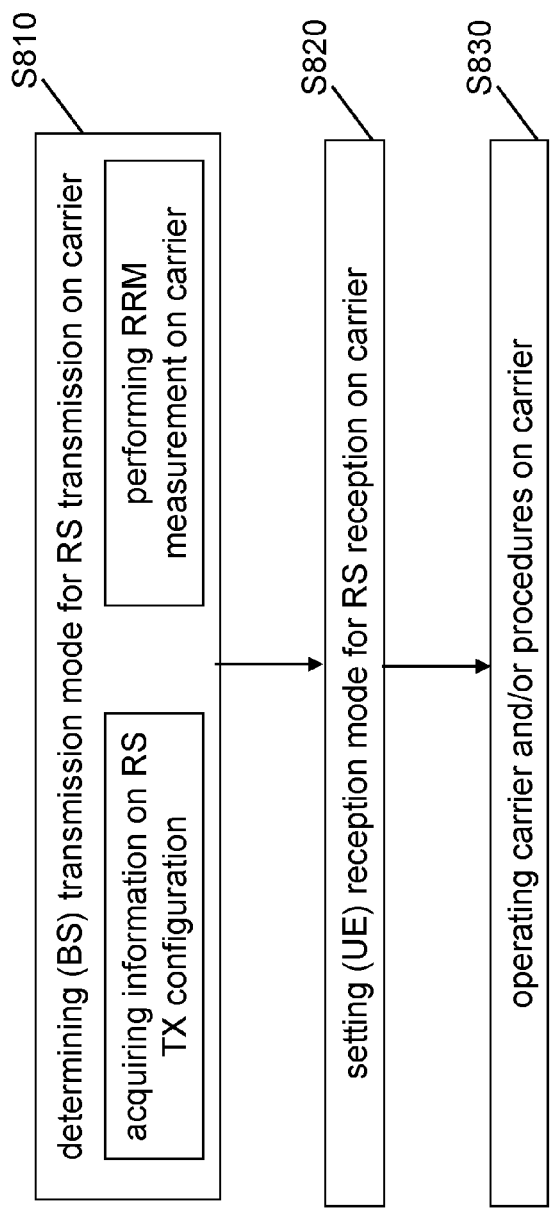
FIG. 8 shows a schematic diagram of a second example of a procedure at a terminal side according to exemplary embodiments of the present invention.

FIG. 8 shows a schematic diagram of a second example of a procedure at a terminal side according to exemplary embodiments of the present invention.

Similar to FIG. 7, the exemplary procedure according to FIG. 8 may be performed at or by a terminal (or modem thereof), such as a user equipment operable in a communication system (e.g. a UE).

The exemplary procedure according to. FIG. 8 may be regarded as a modification/variation or specific implementation of the exemplary procedure according to FIG. 7. In this regard, operations S810 and S820 according to FIG. 8 basically correspond to operations S710 and S720 according to FIG. 7, respectively. Accordingly, reference is made to the above description in conjunction with FIG. 7 for details, while in the following specifics of the exemplary procedure according to FIG. 8 are outlined.

As shown in FIG. 8, a procedure according to exemplary embodiments of the present invention may comprise (in the context of TX mode determination, e.g. at a terminal side) an operation of acquiring information on a (network-side) transmission configuration of at least one reference signal on a carrier from a base station or access node of a communication system, said information being indicative of the (terminal-side) reception mode to be set for reference signal reception on the carrier, and/or an operation of performing a RRM measurement on the carrier being transmitted from a base station or access node of a communication system.

In the acquisition operation, corresponding information (e.g. information on a (network-side) transmission configuration of the at least one reference signal on the carrier) may be received on the basis of a signaling thereof, e.g. from a base station or access node, as indicated in FIG. 6 above. In the RRM measurement operation, the carrier in question, as transmitted by a base station or access node, as indicated in FIG. 6 above, may be measured, thereby deriving/determining the corresponding information (e.g. information on a (network-side) transmission configuration of the at least one reference signal on the carrier).

As shown in FIG. 8, independent of a realization of the operations S810 and S820, a procedure according to exemplary embodiments of the present invention may comprise an operation (S830) of operating the carrier and/or any procedures on the carrier on the basis of at least one of the set (terminal-side) reception mode for reference signal reception on the carrier and a (terminal-side) reception configuration of at least one reference signal on the carrier.

As outlined above, a UE may determine (autonomously or externally informed e.g. by the eNodeB) which RS configuration is being used on a specific carrier at a specific time instant, and consequently operate accordingly. As different requirements may be specified for different RS TX configurations and/or different TX modes, such corresponding operation may comprise applying the corresponding requirement or requirements according to the RS reception configuration and/or the reception mode on the carrier in question.

Thereby, it may be ensured that the UE knows under which conditions (e.g. which RS configuration) a specific carrier is operating (especially, if the carrier is not configured as a PCell or SCell for the corresponding UE). The UE could be informed (e.g. using RRC signaling) or could autonomously recognize (e.g. using RRM measurement) that the carrier can be operated with at least two RS configurations (corresponding to long and short DTX periods), as outlined above.

As indicated above, the UE may be configured to sound or monitor whether the eNodeB is sending RSs (such as CRS/CSI-RS/PSS/SSS/PBCH subframes) also during the RRM measurement OFF period, and to potentially perform RRM measurements in such period as well.

Accordingly, the setting and configuration operations at the network side may be beneficially utilized at the terminal side, i.e. the terminal side may adjust thereto, according to exemplary embodiments of the present invention.

In one embodiment, the transmission mode is set on the basis of at least one of an activation state of the carrier as serving cell and/or secondary cell and/or measurement object cell and a period of radio resource management measurement on the carrier, and/or the transmission of the at least one reference signal is configured on a subframe basis on the carrier.

In one embodiment, the method further comprises determining an activation state of the carrier as serving cell and/or secondary cell and/or measurement object cell, and/or determining a period of radio resource management measurement on the carrier.

In one embodiment, the activation state determination comprises monitoring presence of terminals having at least one of an activated serving cell and/or secondary cell and/or a configured measurement object on the carrier, wherein the activation state of the carrier is determined as an activated state, when presence of at least one such terminal is monitored, and the activation state of the carrier is determined as a deactivated state, when presence of no such terminal is monitored, and/or the resource management measurement period determination comprises establishing an on period or an off period for the carrier.

In one embodiment, the short-cycle discontinuous transmission mode is set as the transmission mode for reference signal transmission on the carrier, when the activation state of the carrier is determined as an activated state, or the long-cycle discontinuous transmission mode is set as the transmission mode for reference signal transmission on the carrier, when the activation state of the carrier is determined as a deactivated state, or the long-cycle discontinuous transmission mode is set as the transmission mode for reference signal transmission on the carrier, when the activation state of the carrier is determined as a deactivated state and the period of radio resource management measurement on the carrier is determined as an on period, and a transmission mode without any reference signal transmission on the carrier is set, when the activation state of the carrier is determined as a deactivated state and the period of radio resource management measurement on the carrier is determined as an off period.

In one embodiment, the at least one reference signal configured for transmission on the carrier is specified according to the set transmission mode and/or according to the determined period of radio resource management measurement on the carrier.

In one embodiment, the at least one reference signal comprises one or more reference signals suitable for enabling radio resource management measurement on the carrier at a terminal, when the period of radio resource management measurement on the carrier is determined as an on period, and/or the at least one reference signal comprises one or more reference signals suitable for enabling one or more of time synchronization, frequency synchronization, tracking, channel quality measurement, channel estimation, channel demodulation, and radio resource management measurement on the carrier at a terminal, when the activation state of the carrier is determined as an activated state.

In one embodiment, the method is operable when the carrier is switched on and/or data scheduling on the carrier is started.

In one embodiment, the method further comprises signaling information on a transmission configuration of the at least one reference signal on the carrier to at least one of a base station or access node of a communication system and a terminal, and/or acquiring information on a transmission configuration of at least one reference signal on the carrier from a base station or access node of a communication system.

In one embodiment, the method is operable at or by a base station or access node of a communication system, and/or the carrier is a carrier subject to carrier aggregation, and/or the at least one reference signal comprises one of more of a common reference signal, a channel state information reference signal, a primary synchronization signal, a secondary synchronization signal, and a physical broadcast channel.

In one embodiment the determining comprises, acquiring information on a transmission configuration of at least one reference signal on a carrier from a base station or access node of a communication system, said information being indicative of the reception mode to be set for reference signal reception on the carrier, and/or performing a radio resource management measurement on the carrier being transmitted from a base station or access node of a communication system.

In one embodiment the method further comprises operating the carrier and/or any procedures on the carrier on the basis of at least one of the set reception mode for reference signal reception on the carrier and a reception configuration of at least one reference signal on the carrier.

In one embodiment, the method is operable at or by a terminal operable in the communication system, and/or the carrier is a carrier subject to carrier aggregation, and/or the at least one reference signal comprises one of more of a common reference signal, a channel state information reference signal, a primary synchronization signal, a secondary synchronization signal, and a physical broadcast channel.

In view of the above, exemplary embodiments of the present invention provide for an advanced configuration of carrier-related reference signal transmission. The configuration of carrier-related reference signal transmission according to exemplary embodiments of the present invention is capable of realizing adaptability to fast traffic variations and an enhanced energy savings potential.

For example, exemplary embodiments of the present invention may be implemented or regarded as a corresponding mechanism (including functional and structural properties) for configuration of carrier-related reference signal transmission, as well as a new carrier or carrier type as such (i.e. a carrier or carrier type being configured or configurable accordingly), which may be applicable e.g. to 3GPP Release 11 onwards, and/or a carrier-related state machine for such configuration of reference signal transmission according to exemplary embodiments of the present invention.

By virtue of exemplary embodiments of the present invention, increased energy savings at the eNodeB are achievable, while facilitating adaptability to fast traffic variations. Such properties are achievable in that since the RS transmission on the thus configured carrier or carrier type can be immediately switched off as soon as all SCell(s) configured on the corresponding carrier are deactivated.

By virtue of exemplary embodiments of the present invention, it might be the case that RS for RRM measurements can only be available during specific time periods (during RRM measurement ON periods). Also, UE-specific DRX parameters can be set taking into account the configuration of the RRM measurement ON and OFF periods. In this regard, as mentioned above, it can be possible for the UE to "sound" whether the eNodeB is transmitting RS also during the RRM measurement OFF periods, and to perform measurements in case the carrier is active. Such operation would be feasible when the UE operates carrier RRM measurements in an autonomous mode.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 9, while for the sake of brevity reference is made to the detailed description of respective corresponding schemes, methods and functionality, principles and operations according to FIGS. 1 to 8.

Figure 9:
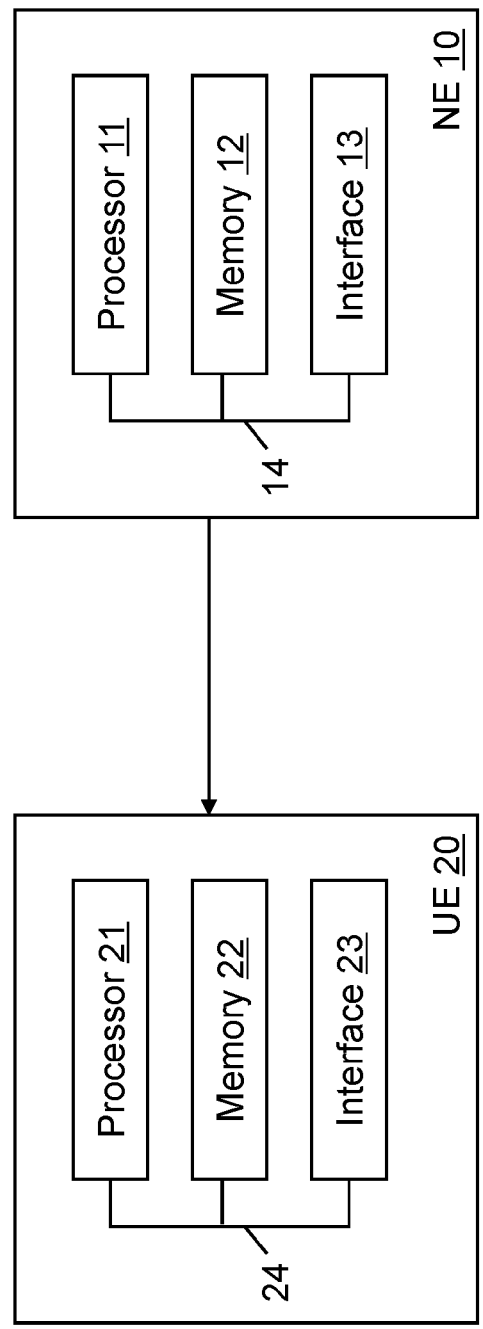
FIG. 9 shows a schematic diagram of exemplary apparatuses according to exemplary embodiments of the present invention.

In FIG. 9 below, the solid line blocks are basically configured to perform respective operations as described above. The entirety of solid line blocks are basically configured to perform the methods and operations as described above, respectively. With respect to FIG. 9, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 9, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 9 shows a schematic diagram of exemplary apparatuses according to exemplary embodiments of the present invention.

In view of the above, the thus illustrated apparatuses 10 and 20 are suitable for use in practicing the exemplary embodiments of the present invention, as described herein.

The thus illustrated apparatus 10 may represent a (part of a) network element (e.g. a modem thereof), such as a base station or access node, and may be configured to perform a procedure and/or exhibit a functionality as evident from any one of FIGS. 1 to 6. The thus illustrated apparatus 20 may represent a (part of a) terminal such as a UE (e.g. a modem thereof), and may be configured to perform a corresponding procedure and/or exhibit a corresponding functionality as evident from any one of FIGS. 6 to 8.

As indicated in FIG. 9, according to exemplary embodiments of the present invention, each of the apparatuses 10/20 comprises a processor 11/21, a memory 12/22 and an interface 13/23, which are connected by a bus 14/24 or the like, and the apparatuses may be connected via a link, respectively.

The processor 11/21 and/or the interface 13/23 may also include a modem or the like to facilitate communication over a (hardwire or wireless) link, respectively. The interface 13/23 may include a suitable transceiver coupled to one or more antennas or communication means for (hardwire or wireless) communications with the linked or connected device(s), respectively. The interface 13/23 is generally configured to communicate with at least one other apparatus, i.e. the interface thereof.

The memory 12/22 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "processor configured to [cause the apparatus to] perform xxx-ing" is construed to be equivalent to an expression such as "means for xxx-ing").

In its most basic form, according to exemplary embodiments of the present invention, the apparatus 10 or its processor 11 is configured to perform setting a transmission mode for reference signal transmission on a carrier out of at least a long-cycle discontinuous transmission mode and a short-cycle discontinuous transmission mode, said long-cycle discontinuous transmission mode having a longer transmission discontinuity period than the short-cycle discontinuous transmission mode, and configuring transmission of at least one reference signal on the carrier according to the set transmission mode.

Accordingly, stated in other words, the apparatus 10 may comprise respective means for setting and means for configuring.

As outlined above, in enhanced forms, the apparatus 10 may comprise one or more of respective means for determining a carrier activation state (possibly including means for monitoring presence of terminals with corresponding operating conditions), means for determining a RRM measurement period (possibly including means for establishing an on/off period), and/or means for specifying the at least one reference signal.

In its most basic form, according to exemplary embodiments of the present invention, the apparatus 20 or its processor 21 is configured to perform determining a transmission mode for reference signal transmission on a carrier from a base station or access node of a communication system out of at least a long-cycle discontinuous transmission mode and a short-cycle discontinuous transmission mode, said long-cycle discontinuous transmission mode having a longer transmission discontinuity period than the short-cycle discontinuous transmission mode, and setting the determined transmission mode as a reception mode for reference signal reception on the carrier.

Accordingly, stated in other words, the apparatus 20 may comprise respective means for determining and means for setting.

As outlined above, in enhanced forms, the apparatus 20 may comprise one or more of respective means for acquiring information on a transmission configuration of at least one reference signal, means for performing a radio resource management measurement on the carrier, and/or means for operating the carrier and/or any procedures on the carrier.

For further details regarding the operability/functionality of the individual apparatuses, reference is made to the abode description in connection with any one of FIGS. 1 to 5, respectively.

According to exemplarily embodiments of the present invention, the processor 11/21, the memory 12/22 and the interface 13/23 may be implemented as individual modules, chips, chipsets, circuitries or the like, or one or more of them can be implemented as a common module, chip, chipset, circuitry or the like, respectively.

According to exemplarily embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for configuration of carrier-related reference signal transmission. Such measures exemplarily comprise setting of a transmission mode for reference signal transmission on a carrier out of at least a long-cycle discontinuous transmission mode and a short-cycle discontinuous transmission mode, said long-cycle discontinuous transmission mode having a longer transmission discontinuity period than the short-cycle discontinuous transmission mode, and configuration of a transmission of at least one reference signal on the carrier according to the set transmission mode. The transmission mode setting may for example be based on at least one of an activation state of the carrier as serving cell and/or secondary cell and/or measurement object cell and a period of radio resource management measurement on the carrier.

The measures according to exemplary embodiments of the present invention may be applied for any kind of network environment, such as for example for communication systems in accordance with any related standards of 3GPP and/or 3GPP2, and so on, e.g. UMTS standards and/or HSPA standards and/or LTE standards (including LTE-Advanced and its evolutions) and/or WCDMA standards.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
CA Carrier Aggregation
CC Component Carrier
CQI Channel Quality Information
CRS Common Reference Signal
CSI Channel State information
CSI-RS Channel State Information Reference Signal
DRX Discontinuous Reception
DTX Discontinuous Transmission
eNodeB evolved Node B (E-UTRAN base station)
HSPA High Speed Packet Access
PBCH Physical Broadcast Channel
PCell Primary Cell
PDSCH Physical Downlink Shared Channel
PSS Primary Synchronization Signal
RRC Radio Resource Control
RRM Radio Resource Management
RS Reference Signal
SCell Secondary Cell
SSS Secondary Synchronization Signal
TTI Transmission Time Interval
TX Transmission
UE User Equipment
UMTS Universal Mobile Telecommunications System
UTRAN Universal Terrestrial Radio Access Network
WCDMA Wideband Code Division Multiple Access

The invention claimed is:

1. A method comprising:
setting a transmission mode for reference signal transmission on a carrier out of at least a long-cycle discontinuous transmission mode and a short-cycle discontinuous transmission mode, said wherein the transmission mode is set on the basis of at least one of an activation state of the carrier as serving cell and/or secondary cell and/or measurement object cell and a period of radio resource management measurement on the carrier, and
configuring transmission of at least one reference signal on the carrier according to the set transmission mode.

2. A method comprising:
determining a transmission mode for reference signal transmission on a carrier from a base station or access node of a communication system out of at least a long-cycle discontinuous transmission mode and a short-cycle discontinuous transmission mode, wherein the transmission mode is determined on the basis of at least one of an activation state of the carrier as serving cell and/or secondary cell and/or measurement object cell and a period of radio resource management measurement on the carrier, and
setting the determined transmission mode as a reception mode for reference signal reception on the carrier.

3. An apparatus comprising:
an interface configured to communicate with at least another apparatus, a memory configured to store computer program code, and a processor, wherein the memory and the computer code are configured with the processor to cause the apparatus to perform:
setting a transmission mode for reference signal transmission on a carrier out of at least a long-cycle discontinuous transmission mode and a short-cycle discontinuous transmission mode, wherein the transmission mode is set on the basis of at least one of an activation state of the carrier as serving cell and/or secondary cell and/or measurement object cell and a period of radio resource management measurement on the carrier, and
configuring transmission of at least one reference signal on the carrier according to the set transmission mode.

4. The apparatus according to claim 3, wherein the memory and the computer code are further configured with the processor to cause the apparatus to perform:
configuring the transmission of the at least one reference signal on a subframe basis on the carrier.

5. The apparatus according to claim 3, wherein the memory and the computer code are further configured with the processor to cause the apparatus to perform:
determining an activation state of the carrier as serving cell and/or secondary cell and/or measurement object cell, and/or
determining a period of radio resource management measurement on the carrier.

6. The apparatus according to claim 5, wherein the memory and the computer code are further configured with the processor to cause the apparatus to perform:

determining the activation state by monitoring presence of terminals having at least one of an activated serving cell and/or secondary cell and/or a configured measurement object on the carrier, wherein the activation state of the carrier is determined as an activated state, when presence of at least one such terminal is monitored, and the activation state of the carrier is determined as a deactivated state, when presence of no such terminal is monitored, and/or determining the resource management measurement period by establishing an on period or an off period for the carrier.

7. The apparatus according to claim 5, wherein the memory and the computer code are further configured with the processor to cause the apparatus to perform:

setting the short-cycle discontinuous transmission mode as the transmission mode for reference signal transmission on the carrier, when the activation state of the carrier is determined as an activated state, or setting the long-cycle discontinuous transmission mode as the transmission mode for reference signal transmission on the carrier, when the activation state of the carrier is determined as a deactivated state, or setting the long-cycle discontinuous transmission mode as the transmission mode for reference signal transmission on the carrier, when the activation state of the carrier is determined as a deactivated state and the period of radio resource management measurement on the carrier is determined as an on period, and a transmission mode without any reference signal transmission on the carrier is set, when the activation state of the carrier is determined as a deactivated state and the period of radio resource management measurement on the carrier is determined as an off period.

8. The apparatus according to claim 5, wherein the memory and the computer code are further configured with the processor to cause the apparatus to perform:

specifying the at least one reference signal configured for transmission on the carrier according to the set transmission mode and/or according to the determined period of radio resource management measurement on the carrier.

9. The apparatus according to claim 8, wherein the at least one reference signal comprises one or more reference signals suitable for enabling radio resource management measurement on the carrier at a terminal, when the period of radio resource management measurement on the carrier is determined as an on period, and/or the at least one reference signal comprises one or more reference signals suitable for enabling one or more of time synchronization, frequency synchronization, tracking, channel quality measurement, channel estimation, channel demodulation, and radio resource management measurement on the carrier at a terminal, when the activation state of the carrier is determined as an activated state.

10. The apparatus according to claim 3, wherein the memory and the computer code are further configured with the processor to cause the apparatus to perform:

setting and configuring operations when the carrier is switched on and/or data scheduling on the carrier is started.

11. The method according to claim 3, wherein the memory and the computer code are further configured with the processor to cause the apparatus to perform:

signaling information on a transmission configuration of the at least one reference signal on the carrier to at least one of a base station or access node of a communication system and a terminal, and/or acquiring information on a transmission configuration of at least one reference signal on the carrier from a base station or access node of a communication system.

12. The apparatus according to claim 3, wherein the apparatus is operable as or at a base station or access node of a communication system, and/or the carrier is a carrier subject to carrier aggregation, and/or the at least one reference signal comprises one of more of a common reference signal, a channel state information reference signal, a primary synchronization signal, a secondary synchronization signal, and a physical broadcast channel.

13. An apparatus comprising:

an interface configured to communicate with at least another apparatus, a memory configured to store computer program code, and a processor, wherein the memory and the computer code are configured with the processor to cause the apparatus to perform:

determining a transmission mode for reference signal transmission on a carrier from a base station or access node of a communication system out of at least a long-cycle discontinuous transmission mode and a short-cycle discontinuous transmission mode, wherein the transmission mode is determined on the basis of at least one of an activation state of the carrier as serving cell and/or secondary cell and/or measurement object cell and a period of radio resource management measurement on the carrier, and setting the determined transmission mode as a reception mode for reference signal reception on the carrier.

14. The apparatus according to claim 13, wherein the memory and the computer code are further configured with the processor to cause the apparatus to perform:

acquiring information on a transmission configuration of at least one reference signal on a carrier from a base station or access node of a communication system, said information being indicative of the reception mode to be set for reference signal reception on the carrier, and/or performing a radio resource management measurement on the carrier being transmitted from a base station or access node of a communication system.

15. The apparatus according to claim 13, wherein the memory and the computer code are further configured with the processor to cause the apparatus to perform:

operating the carrier and/or any procedures on the carrier on the basis of at least one of the set reception mode for reference signal reception on the carrier and a reception configuration of at least one reference signal on the carrier.

16. The apparatus according to claim 13, wherein the apparatus is operable as or at a terminal operable in the communication system, and/or the carrier is a carrier subject to carrier aggregation, and/or the at least one reference signal comprises one of more of a common reference signal, a channel state information reference signal, a primary synchronization signal, a secondary synchronization signal, and a physical broadcast channel.

17. A computer program product embodied on a non-transitory computer-readable medium in which a computer program is stored that, when the program is run on a computer, is configured to cause the computer to carry out the method according to claim 1.

\* \* \* \* \*